Figure 1:
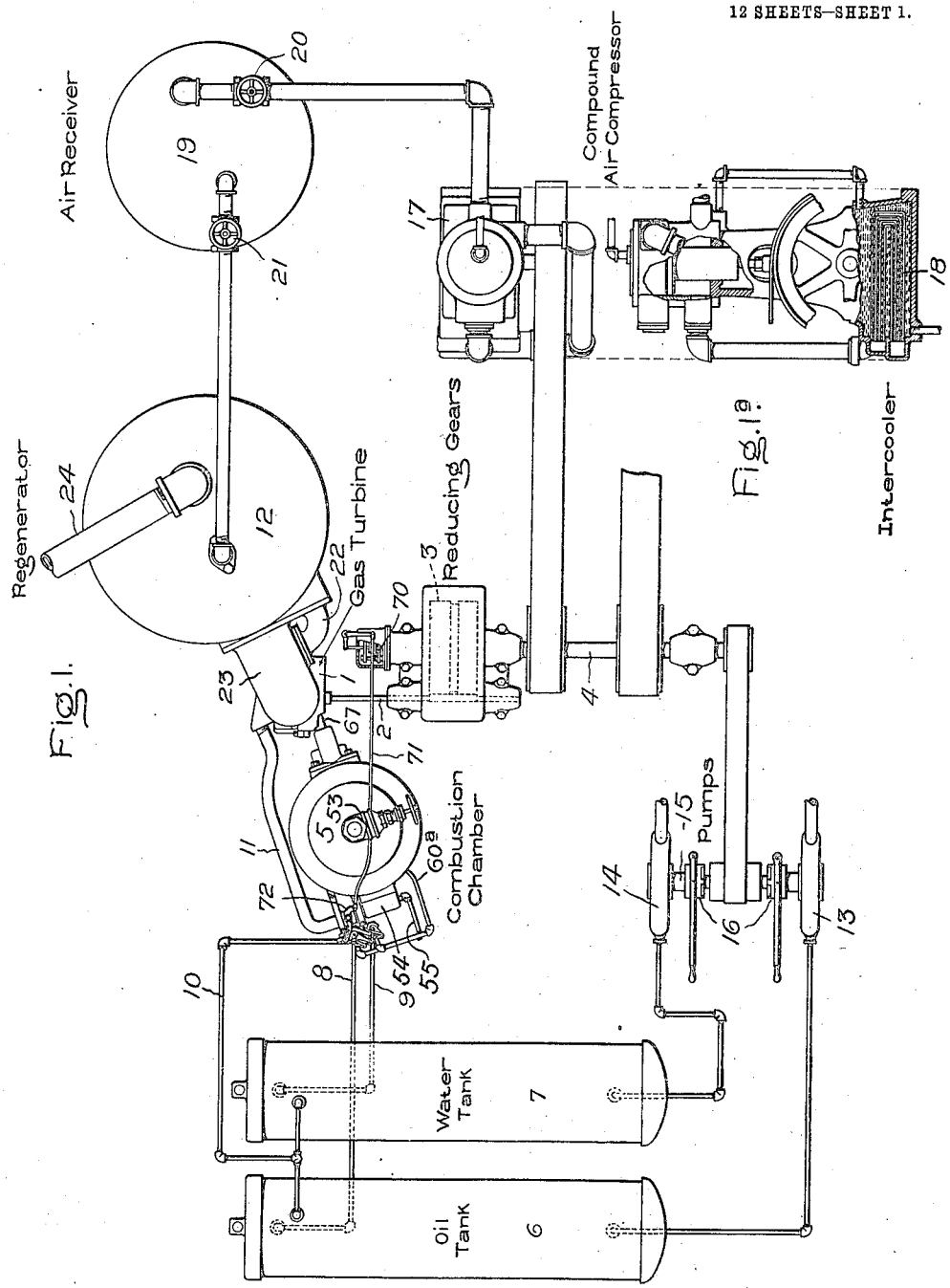

S. A. MOSS.
GAS TURBINE.
APPLICATION FILED DEC. 31, 1904.

1,064,665.

Patented June 10, 1913.
12 SHEETS—SHEET 2.

Witnesses:
Helen Alford
Alex. F. Macdonald.

Inventor,
Sanford A. Moss,
By Albert G. Davis
Att'y.

S. A. MOSS.
GAS TURBINE.
APPLICATION FILED DEC. 31, 1904.

1,064,665.

Patented June 10, 1913.
12 SHEETS—SHEET 4.

Witnesses:

Inventor,
Sanford A. Moss
By Albert G. Davis
Att'y

S. A. MOSS.
GAS TURBINE.
APPLICATION FILED DEC. 31, 1904.
1,064,665.
Patented June 10, 1913.
12 SHEETS—SHEET 5.
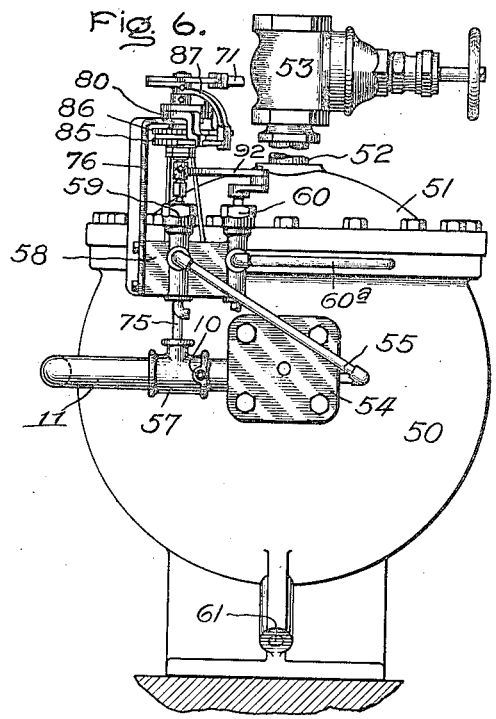
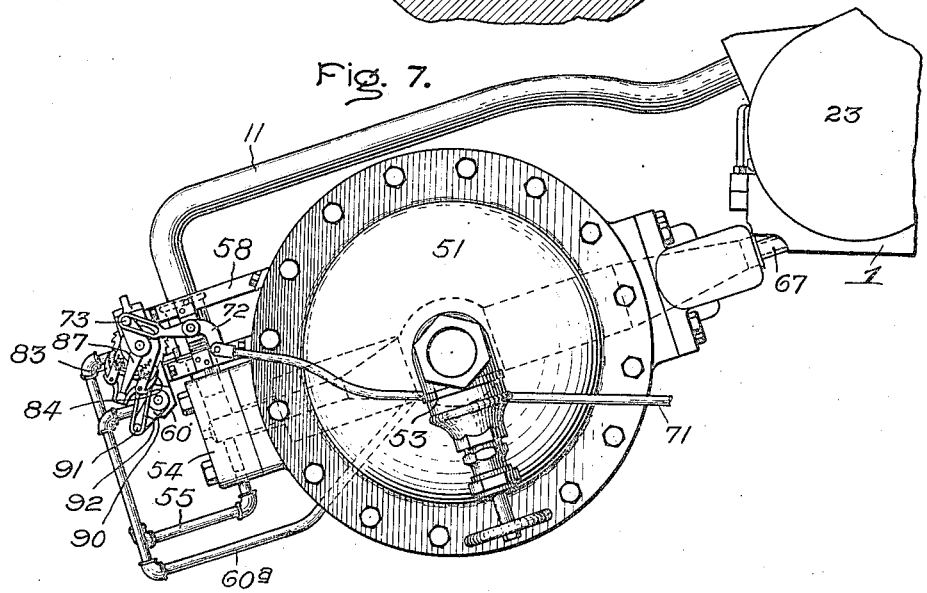
Witnesses:
Helen Orford
Alex. F. Macdonald
Inventor,
Sanford A. Moss,
By Albert G. Davis
Atty.

S. A. MOSS.
GAS TURBINE.
APPLICATION FILED DEC. 31, 1904.
1,064,665.
Patented June 10, 1913.
12 SHEETS—SHEET 6.
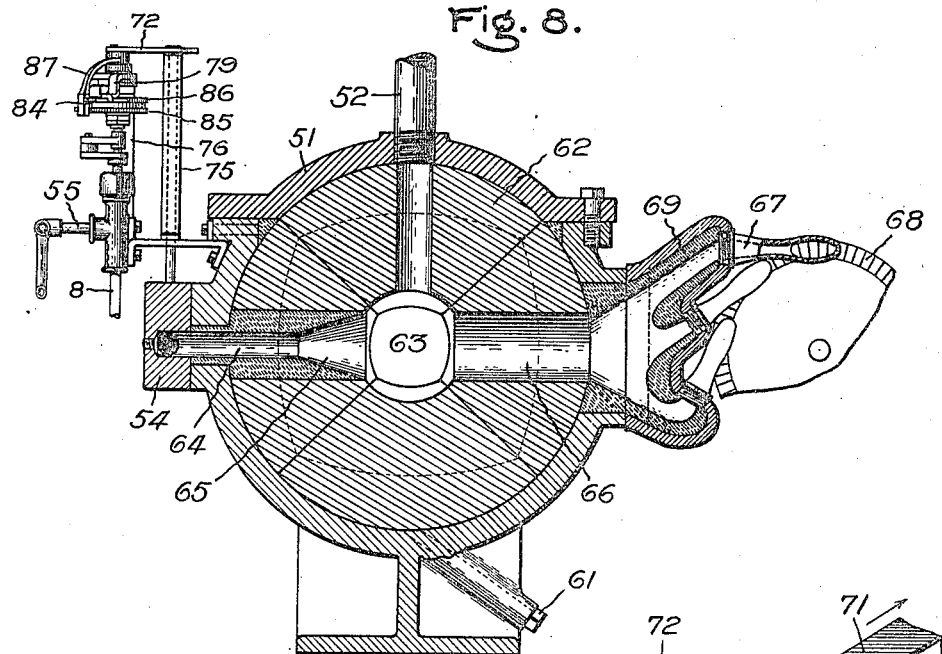
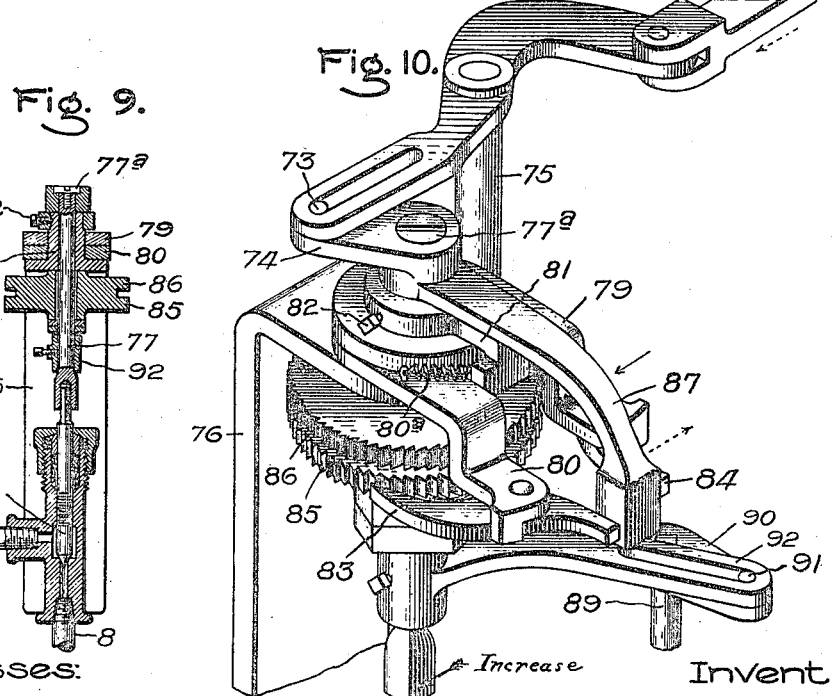
Witnesses:
Helen Orford
Alex F. Macdonald
Inventor,
Sanford A. Moss,
By Albert G. Davis
Atty.

S. A. MOSS.
GAS TURBINE.
APPLICATION FILED DEC. 31, 1904.
1,064,665.
Patented June 10, 1913.
12 SHEETS—SHEET 7.
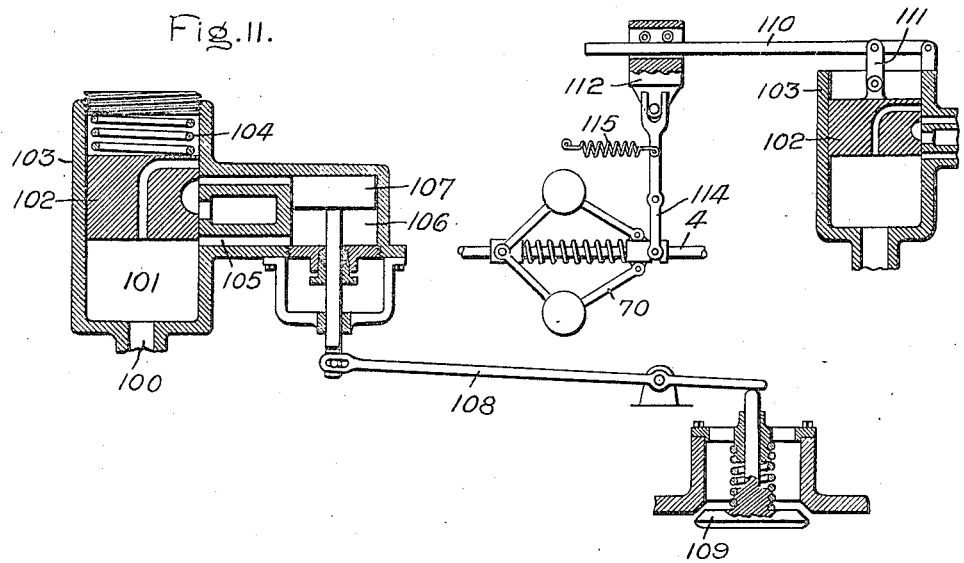
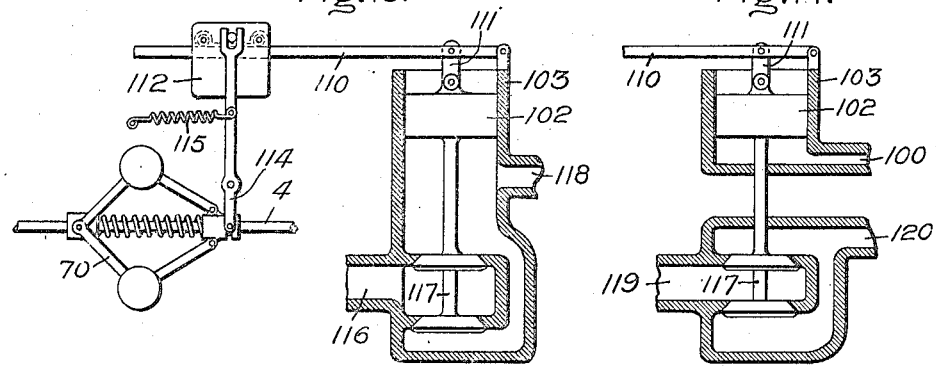
Witnesses:
Helen Oxford
Alex F. Macdonald
Inventor,
Sanford A. Moss,
By Albert G. Davis
Att'y

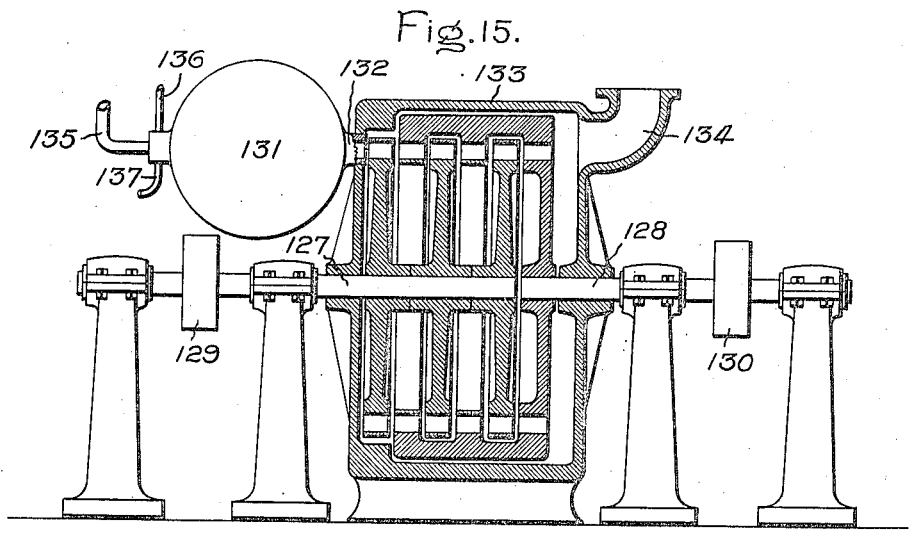
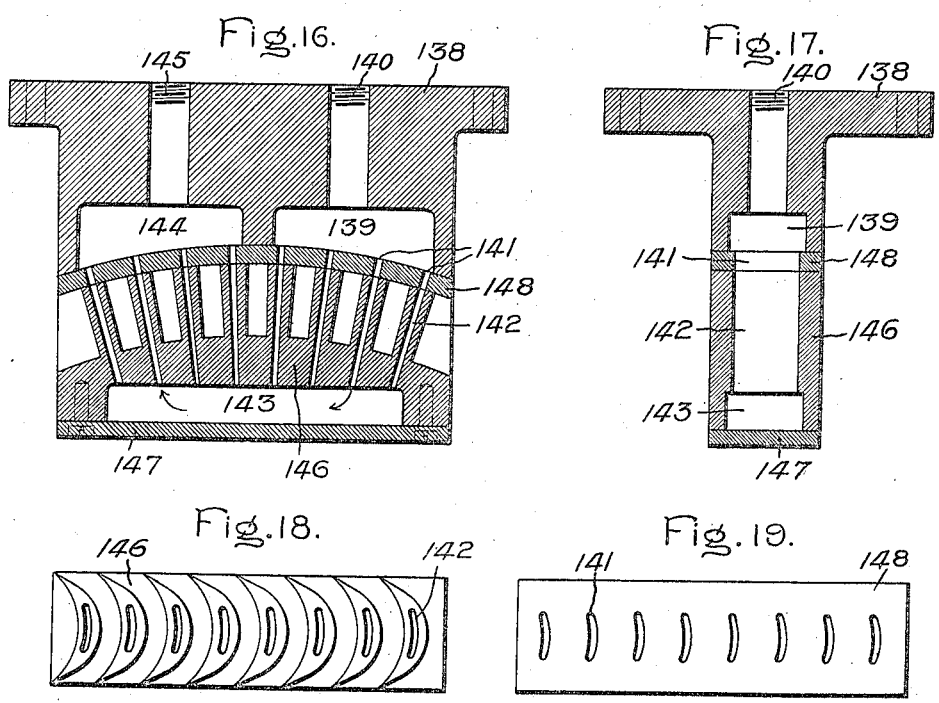

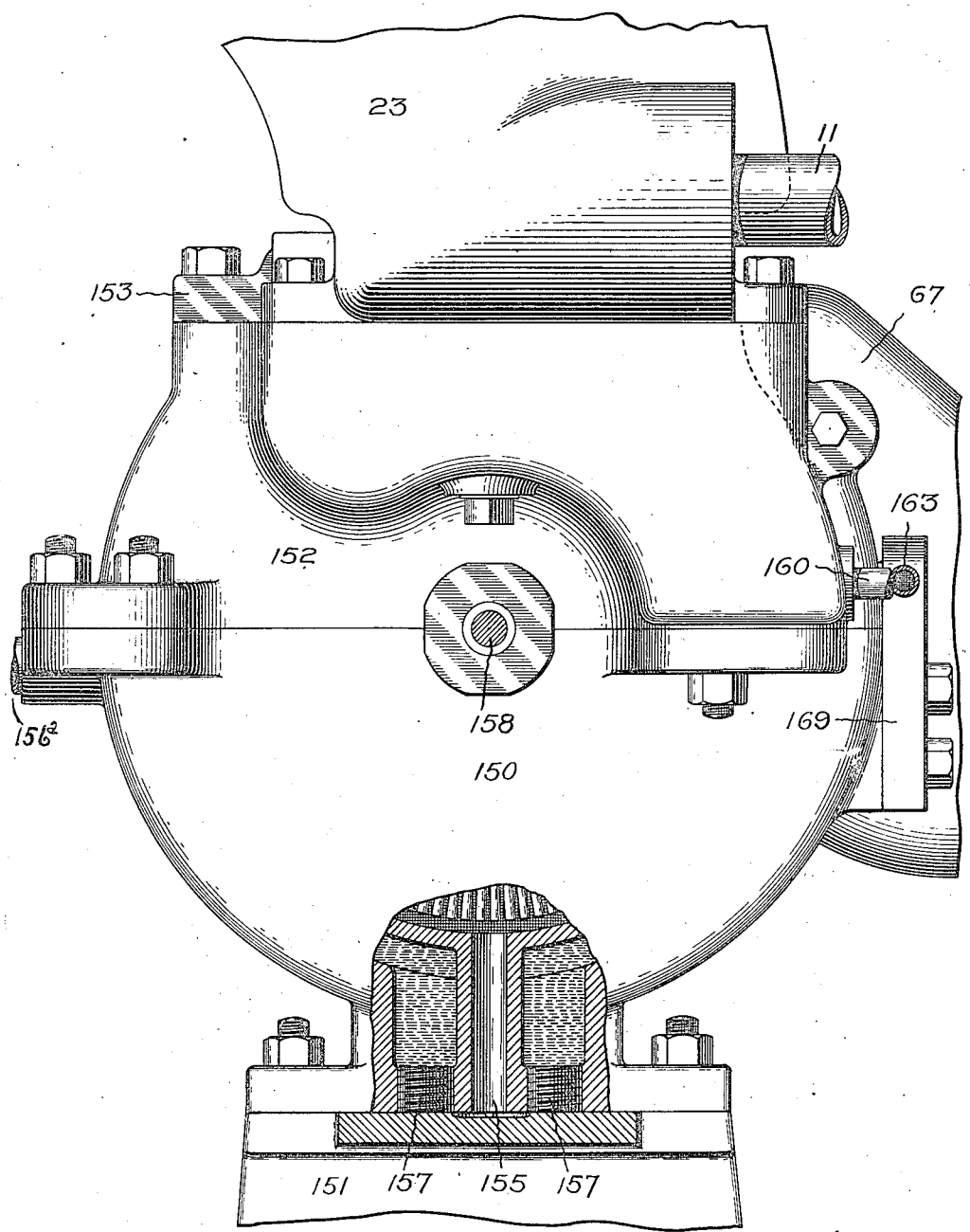

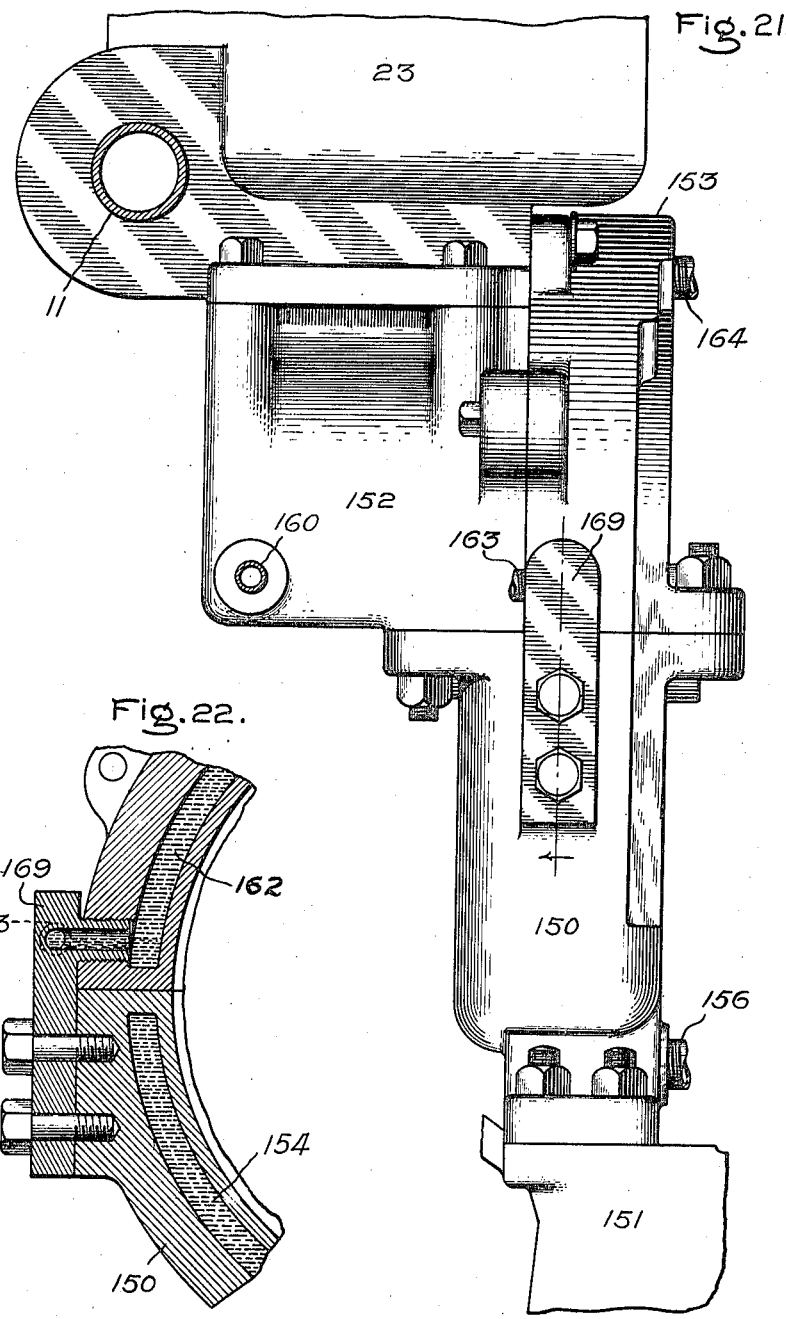

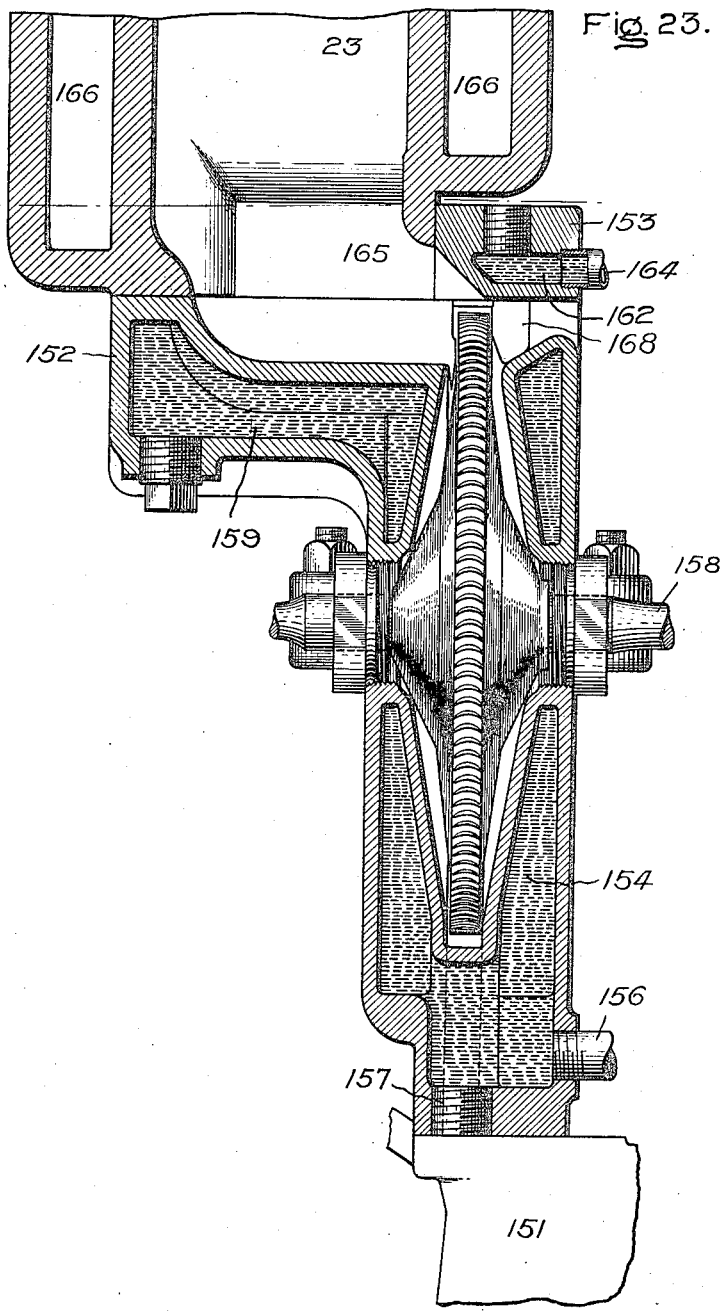

S. A. MOSS.
GAS TURBINE.
APPLICATION FILED DEC. 31, 1904.
1,064,665.
Patented June 10, 1913.
12 SHEETS—SHEET 12.
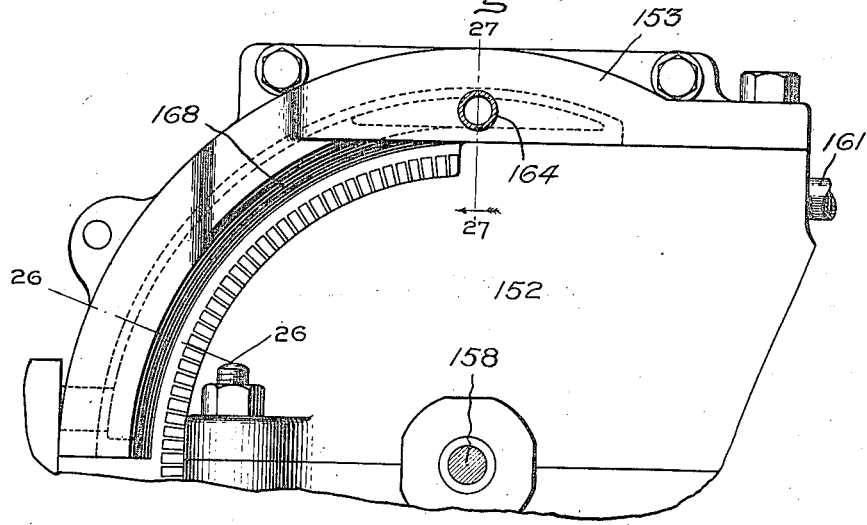
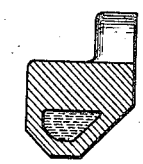
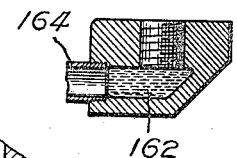
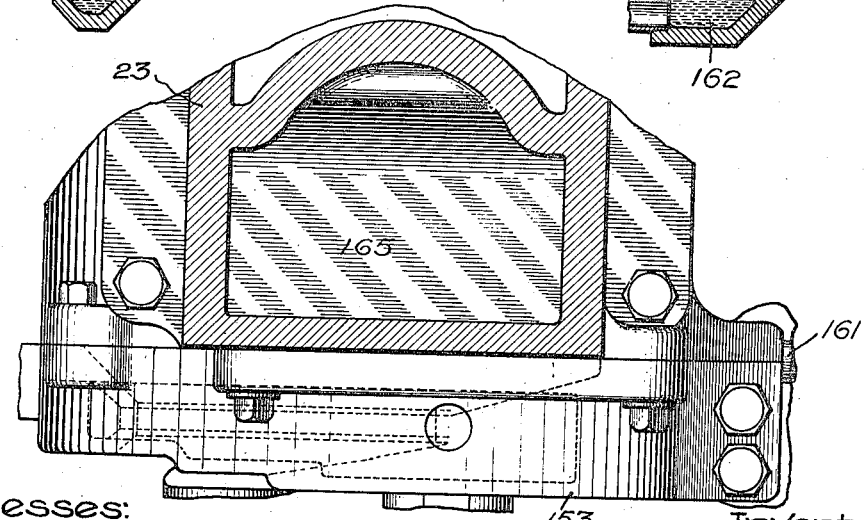
Witnesses:
Helen Orford
Alex F. Macdonald.
Inventor,
Sanford A. Moss,
By Albert G. Davis
Atty.

UNITED STATES PATENT OFFICE.

SANFORD A. MOSS, OF LYNN, MASSACHUSETTS, ASSIGNOR TO GENERAL ELECTRIC COMPANY, A CORPORATION OF NEW YORK.

GAS-TURBINE.

1,064,665.

Specification of Letters Patent.  Patented June 10, 1913.

Application filed December 31, 1904. Serial No. 239,089.

*To all whom it may concern:*

Be it known that I, SANFORD A. MOSS, a citizen of the United States, residing at Lynn, in the county of Essex, State of Massachusetts, have invented certain new and useful Improvements in Gas-Turbines, of which the following is a specification.

The present invention has for its object to improve the construction and operation of gas turbines and their accessories.

In carrying out the invention, a turbine of suitable construction is provided, such for example as a Curtis, de Laval or Parsons machine. Situated at a convenient point with respect to the turbine is a chamber lined with heat-resisting material wherein combustion takes place. The lining for the chamber is preferably made in segments or sections, one or more of which can be removed by taking off a cover. The combustion chamber is supplied with fuel of a suitable character. I may use crude or refined petroleum oil, gasolene, kerosene, natural gas, manufactured gas, coal, wood, or in fact any substance which when burned in air will produce heat. As the substances most commonly used will be oil and air, my description will be more specifically directed thereto. Oil and air, or the other substances which are combined to produce heat, are introduced into the combustion chamber where they are burned under a pressure more or less great. The existence of this pressure is the fundamental reason why the gas turbine can operate and produce power in excess of that required to force oil and air or other substances into the combustion chamber. The fuel and air or other substances are fed into the combustion chamber at such a rate, and the cross-sectional area of the device or devices discharging the hot gases to the turbine is so proportioned, that a pressure greater than atmosphere is always maintained in the combustion chamber, said pressure of course exceeding that of the turbine shell or casing. The burning of the fuel in the combustion chamber greatly increases the volume of the air therein, and the latter, mixed with the products of combustion, passes to the nozzle or nozzles or the device or devices admitting fluid to the turbine vanes or buckets. The mixture is discharged against the vanes in a direction to produce rotation of the turbine wheel or wheels. I prefer to use an expanding nozzle or nozzles since by so doing the temperature of the gases is somewhat reduced before striking the wheel and the efficiency increased. The combustion chamber and the one or more passages leading to the gas-discharging device or devices should be thoroughly protected by a lining of heat-resisting material. Experience has demonstrated that the gas-discharging parts such as the nozzles will be heated to a very high temperature, and means must be provided to prevent the deleterious effects as much as possible. In order to prevent the flames from working back into the source of fuel supply or "back firing," as it is sometimes called, special means are provided. In the present form of the invention, an expanding nozzle is provided as a means for attaining the desired end. This nozzle receives the mixture of compressed air and fuel and discharges it into the combustion chamber under such a velocity as will prevent the flames from working back into the supply pipes or conduits.

I have found that where any substantial amount of power is to be obtained from the turbine, the amount of fuel consumed will heat the parts to a prohibitive extent. To avoid this I continuously introduce water or other liquid into the combustion chamber in such amounts as will maintain the temperature of the gases within reasonable limits. The relative amounts of fuel, water and air admitted to the combustion chamber are preferably regulated as will appear hereinafter.

Air is supplied to the combustion chamber by an air compressor of suitable construction. It may be of the usual construction employing one or more reciprocating pistons, or it may be of the rotary type. The compressor may be driven by the turbine itself or by a separate source of power.

In the latter case the entire output of the turbine will be available. I find it desirable to use a compound or multi-stage air compressor. I prefer to cool the air or other gas as it passes through the compressor so that the compression is isothermal or as close to it as it is practicable to obtain. This cooling may be done by injecting water into the cylinders during compression, by surrounding the cylinders with a water jacket, or by compressing by stages with an inter-cooler between stages, or any combination of these means. The power required for compression is reduced by this cooling, at the expense however of the loss of heat ordinarily generated by the act of compression, this heat being absorbed by the cooling water or other means above specified. By using a regenerator heated by the exhaust gases from the turbine, together with an isothermal compression, there will be a large net gain, since in this case theoretically the only loss will be the heat thrown away with the cooling water. If desired some or all of the water in the cooling system of the apparatus can be discharged into the combustion chamber and the heat therein saved. The gases after compression will be practically at atmospheric temperature so that the entire heat of the exhaust will theoretically be added to them. Theoretically the exhaust should leave the regenerator at practically atmospheric temperature, but practically the temperature is somewhat above this. In case a regenerator is not used it will still be advantageous in many cases to have isothermal or approximately isothermal compression owing to the great reduction in the negative power due to the compressor. The net power obtained from the turbine will then be increased without any change in the size of the combustion chamber or of the bucket wheel or wheels. The compressor preferably, although not necessarily, discharges into an air receiver or tank of considerable size which acts as a reservoir and insures a constant even flow of air to the combustion chamber. Between the compressor, air receiver and the combustion chamber are valves for holding air in the receiver when the turbine is shut down. In starting the turbine into action after a period of rest, the air in the receiver may be used for starting, or a separate source of air may be employed. In the latter case one receiver may be used for starting, the other for reducing variations in pressure.

Since the operation of the turbine depends principally upon the increase in volume of the air or other gas due to heating, a regenerator is connected to the air receiver and the combustion chamber at a point as near to the latter and the turbine as possible. The temperature of the exhaust from the turbine is high, and to utilize the heat which would otherwise be wasted, the exhaust of the turbine is piped to the regenerator and in this manner the temperature of the air is greatly increased before entering the combustion chamber. The amount of said increase is governed principally by the temperature of the exhaust gases, and by the effective use of such gases in the regenerator. In general it may be stated that the air-carrying conduit should present an extended surface area to the gases.

Fuel and water are supplied to the combustion chamber from tanks or other suitable sources of supply under pressure due to head or otherwise. A suitable arrangement comprises a couple of tanks, one for fuel and the other for water. Connected to each tank is a pump for maintaining a definite pressure therein. The tanks may contain a body of elastic fluid such as air or other gas under pressure, which tends to force the liquid therein to the combustion chamber, or a spring, weight or equivalent device may be employed. The pumps need not be continuously in operation in all installations, and where this is the case suitable clutches are employed to connect and disconnect them from a driving shaft. The pumps may be driven by the turbine or by a separate source of power. Owing to the difficulty in adjusting the pumps and other parts to maintain equal pressures in the supply tanks, and to prevent the tank of higher pressure feeding into the one of lower pressure, an equalizing pipe or connection is employed which extends to both tanks and to the air-pressure pipe.

The supply of energy to the turbine may be governed in a variety of ways, of which the more important will be specified hereinafter.

The turbine is provided with a shaft governor which may be mounted on the main shaft or on a shaft driven by the turbine; the latter arrangement is preferable where the speed of the turbine is high. Under the control of the governor are one or more valves for regulating the admission of oil, air or other gas or water or other cooling fluid to the combustion chamber. I may control all three of these supplies at the point of entrance to the combustion chamber or at some point remote therefrom. In some cases it may be unnecessary to control all three of the supplies, in which case the air alone may be controlled, or the fuel alone, or the cooling fluid, or two of said supplies may be controlled. Ordinarily it will be found best however to control all of them. As an example of such a construction the governor may be directly connected to a throttle valve in the air supply, to a valve that regulates the fuel supply and to a valve that regulates the supply of water, either directly or indirectly to the combustion chamber. All things being equal, the nearer the regulating devices are to the turbine, the more effective will be the regulation. This is particularly true where the combustion chamber contains a considerable mass of material which changes its temperature relatively slowly. The supplies of fuel, water and air will increase and decrease depending upon the load on the turbine, and within certain limits this increase or decrease of the supplies will take place in definite proportion, but it is to be understood that under certain conditions, the proportions of the supplies one to the other will vary. That is to say, one may gain or lose a little with respect to the other or others. As a broad proposition, it may be stated however that the supplies bear a definite relation to each other for general operating conditions. When the air supply is throttled, it is desirable to provide a pressure regulator for the compressor to prevent it from increasing the pressure above a predetermined maximum.

It has already been stated that the combustion chamber works under a pressure considerably above atmospheric, which presupposes a sealed chamber. In order to start the turbine, a valved orifice or conduit is provided communicating with the interior of said chamber. By opening this conduit and inserting a torch or other starting device the mixture of fuel and air may be fired. At the time of starting the supplies of fuel and air should be admitted to the chamber at a greatly reduced pressure. It is desirable to prevent the entrance of water or other cooling liquid until the lining of the chamber is well heated. As soon as the mixture is fired, the torch is withdrawn and the valve closed, after which the pressure of the mixture may be increased to normal.

In some instances it is desirable to inject the fuel in vapor form instead of in the form of a spray, in which case a suitable vaporizer is provided. Where kerosene is employed as a fuel care should be exercised that the temperature of the oil be gradually increased to the point of vaporization, since otherwise it will crack and form objectionable deposits. When the temperature is gradually raised to the point of vaporization the vapor can be superheated to any desired degree.

Figure 2:
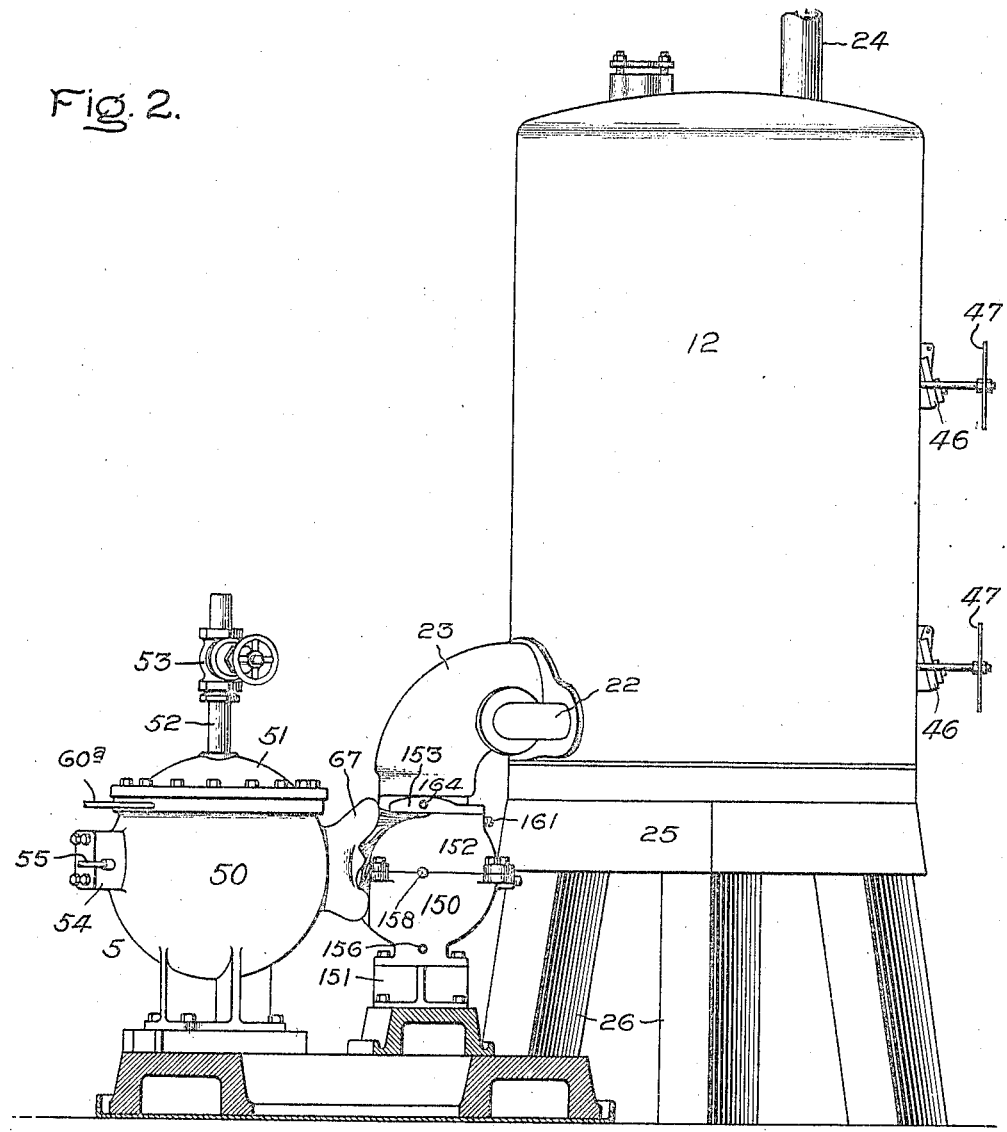
Figure 3:
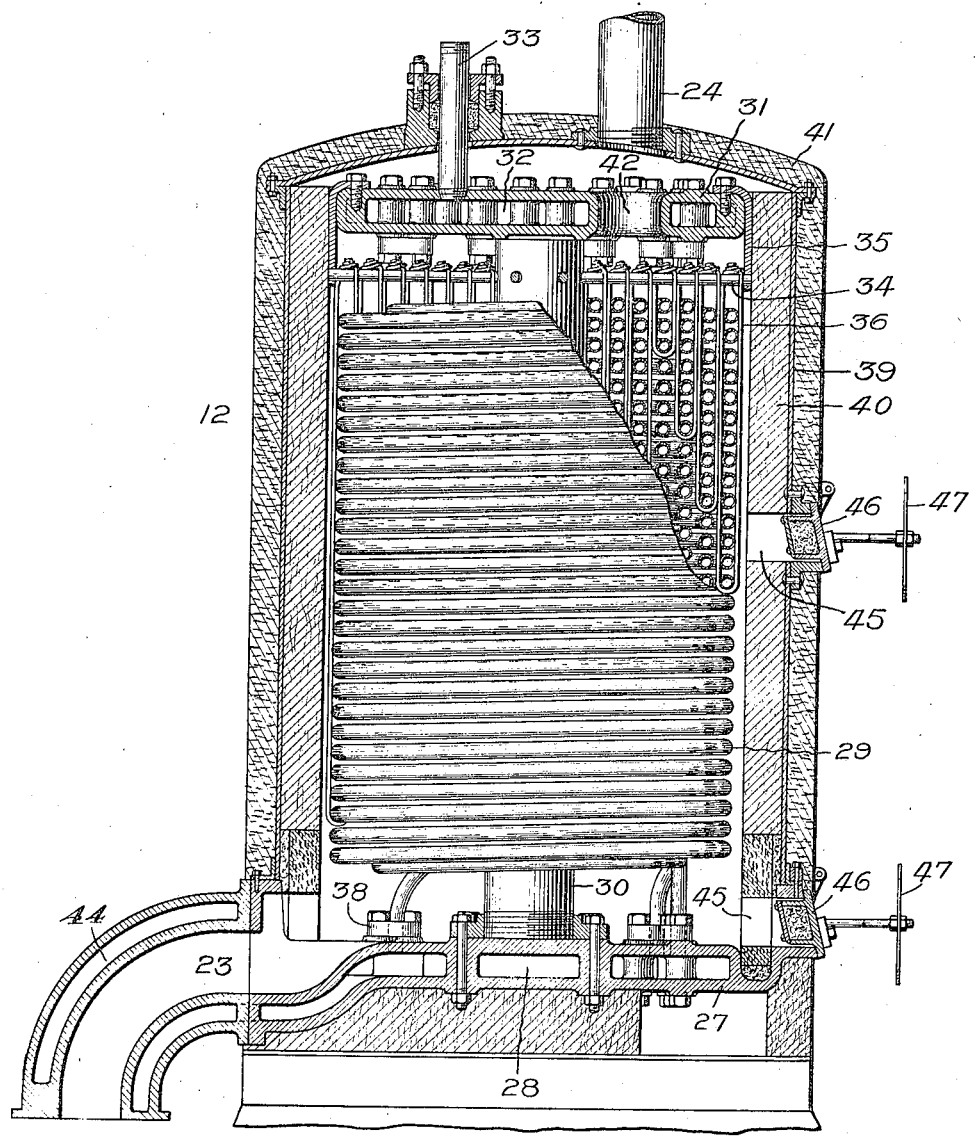
Figure 4:
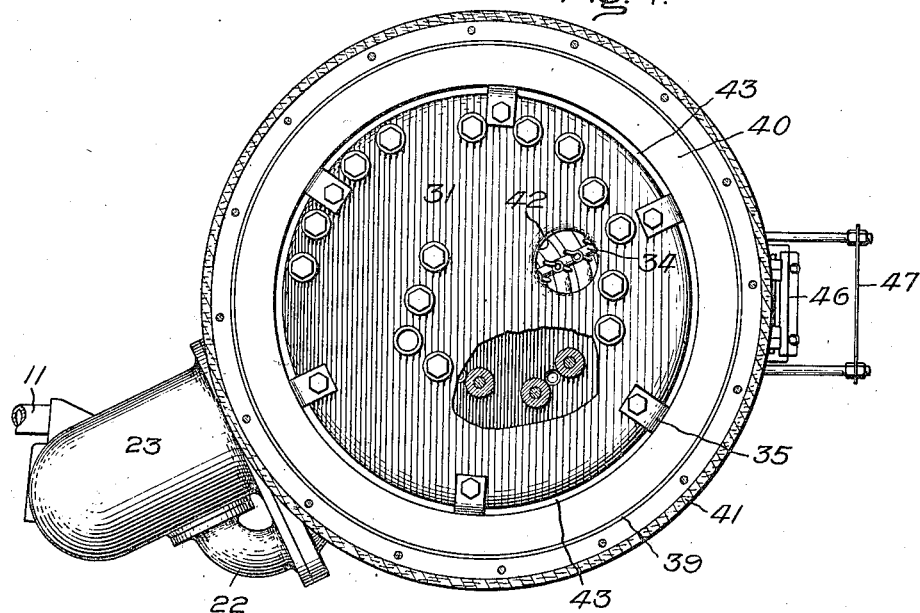
Figure 5:
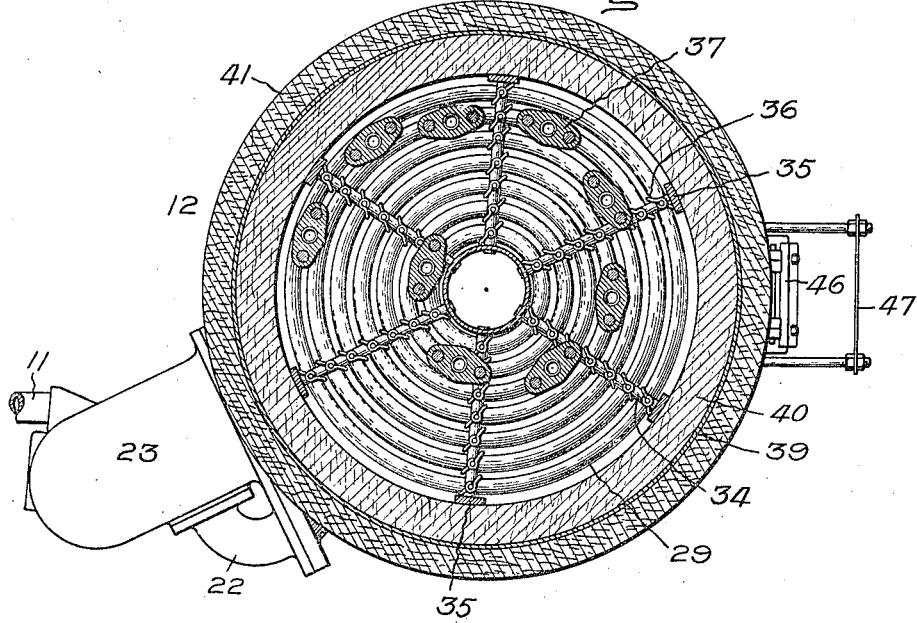

In the accompanying drawings which illustrate certain embodiments of my invention, Figure 1 is a diagrammatic view of a gas turbine, together with its accessories; Fig. 1ᵃ is a view in elevation, with certain of the parts broken away, of a compound air compressor; Fig. 2 is a view in elevation of the turbine, combustion chamber and regenerator; Fig. 3 is a sectional view of the regenerator; Fig. 4 is a view of the regenerator with the cover removed; Fig. 5 is a sectional view of the regenerator taken at a point just below the head which supports the air-carrying pipe; Fig. 6 is a detail view of the combustion chamber and mechanism for regulating the admission of fuel, water and air thereto; Fig. 7 is a plan view of the same; Fig. 8 is a section of the combustion chamber showing the passages leading to the nozzles and bucket wheel of the turbine; Fig. 9 is a sectional view of the valve for regulating the admission of fuel to the combustion chamber; Fig. 10 is a detail view of the mechanism for operating the valve controlling the supply of fuel, air and water; Figs. 11 and 12 are detail sectional views of regulators for the air compressor; Figs. 13 and 14 are detail views of regulators for the air compressor which are under the control of the speed-responsive device; Fig. 15 is a sectional view of a turbine having bucket elements which rotate in opposite directions; Figs. 16 to 19 inclusive are detail views showing water-cooled intermediate buckets; Fig. 20 is a view in side elevation of a gas turbine of my improved construction; Fig. 21 is a view in side elevation of the same; Fig. 22 is a detail sectional view showing the water jacket for the casing; Fig. 23 is an axial section of the turbine; Fig. 24 is a detail view in elevation of the turbine showing the opening arranged to receive the expanding nozzle discharging the products of combustion against the bucket wheel; Fig. 25 is a plan view, partially in section of the turbine; Fig. 26 is a section taken on the line 26 26 of Fig. 24; and Fig. 27 is a detail section taken on line 27 27 of Fig. 24 and looking in the direction of the arrow.

Referring to Fig. 1, 1 is a gas turbine of suitable construction having a main shaft 2 that is connected through reducing gears 3 with the power shaft 4. 5 represents the combustion chamber which receives fuel from the tank 6 and a cooling fluid such as water from the tank 7. The former tank is connected to the chamber by the pipe 8, and the latter by the pipe 9. In order to equalize the pressures in the two tanks and also in the air or other gas supply and the combustion chamber, an equalizing pipe 10 is connected to both tanks and to the pipe 11 conveying air from the regenerator 12 to the combustion chamber. Fuel is supplied to the tank 6 by means of a suitable pump 13, and water is supplied to the tank 7 by the pump 14. These pumps may with advantage be of the centrifugal type, the rotating elements of which are mounted on the shaft 15, the latter being belted or otherwise connected to the power shaft 4. Each pump is provided with a clutch 16 by means of which the rotating element can be started and stopped. I have stated that the tanks are maintained under pressure for feeding fuel and cooling liquid to the combustion chamber, but under certain conditions this arrangement may be modified, particularly in small plants. The fuel or water tanks or both of them may be elevated to a point where the feed will be due to gravity. In this case the equalizing pipe or pipes should be connected to points above and below the main body of the fluid. In other words, when the pressures above and below are equal the fluid will flow freely to the chamber due to its head or difference in level. 17 represents a compound or stage air compressor, and between the cylinders or stages is an intercooler 18 Fig. 1ª, for reducing the temperature of the air undergoing compression. The compressor is belted or otherwise connected to the power shaft 4 of the turbine. The compressor discharges into an air receiver 19 through a conduit containing a valve 20, the latter being employed for shutting off the connection between the compressor and the receiver when the turbine is shut down. The receiver discharges air under pressure to the regenerator 12 through a conduit containing a shut-off valve 21. The regenerator contains one or more coils of pipe, conduits or passages suitably arranged through which the air passes and is gradually heated by the exhaust from the turbine. After passing through the coil or coils of the regenerator the highly heated air is discharged through the conduit 22, as indicated by the arrow, through a chamber surrounding the exhaust-carrying conduit 23 into the pipe 11, the latter communicating with the combustion chamber. The exhaust gases from the turbine, after passing through the regenerator, are discharged by the conduit 24.

Referring to Figs. 2 to 5, inclusive, the construction of the regenerator will be described. 25 represents a support which is mounted upon suitable standards 26 so that the exhaust-receiving conduit 23 will be in a position to receive the exhaust gases directly from the turbine, and this without undue loss of heat from radiation. Mounted within the casing of the regenerator is a cast-metal base 27 that is provided with a chamber 28 to receive the air after it has been passed through the coils of pipe 29. Rising vertically above the base is a tubular column 30 which acts as a support for the head 31, the latter containing a chamber 32 with which the pipe 33 leading from the air receiver is connected. The upper end of the upright column 30 is provided with a number of radial arms 34 which act as supports for the coils 29 to prevent them from sagging. The outer ends of the arms are supported by pieces 35 that are secured to the head 31, the latter resting directly on the top of the column. In the present illustration a number of metal strips 36 are provided which extend between the concentric turns of the coils and at their lower ends form a support for a section of the coil by engaging one of its turns. As shown in Fig. 5, the coils 29 are connected to the head 31 by connectors 37. The coils may be connected in any suitable manner. In the present instance the coils are connected in multiple between the base 28 and the head 31, although other arrangements can be provided if desired. The connection between the lower ends of the coils and the base is by means of connectors 38. Located between the coils and the metal casing 39 is a lining 40 of heat-resisting material. The outside of the casing is preferably covered by a lagging 41 of suitable material to retain the heat within the inclosure. The upper end of the casing is provided with a conduit 24 for discharging the exhaust gases after they have given up a considerable amount of their heat to the compressed air. Situated directly below the conduit 24 is an opening 42 in the upper head which conveys exhaust products from the interior of the casing to the exhaust conduit. In addition to this opening the products can pass through the spaces 43 as shown in Figs. 4 and 5. It is to be noted that the air enters the regenerator at its coolest point and flows toward the point of greatest temperature, namely toward the exhaust-receiving conduit 23. The exhaust conduit 23 is surrounded by a chamber 44, the latter communicating with the chamber 28 in the base of the regenerator, and with the pipe 11, Fig. 1, leading to the combustion chamber. It sometimes happens that a mixture rich in carbon will be accumulated in the regenerator which unduly increases the temperature and pressure therein. To guard against explosions due to this I provide one or more devices which in effect form outwardly opening safety valves responding to increases in pressure in the regenerator. In the construction shown an outwardly opening passage 45 is provided which is normally closed by the plate 46, the latter being weighted to a greater or less extent so that it will close by gravity. The inner face of this plate or valve is protected by a suitable facing of heat-resisting material. Situated in front of the opening and carried by posts or other supports, is a plate 47 which restricts the zone of the flames issuing from the valve to passage 45. As many of these arrangements may be provided as are necessary to properly protect the apparatus, and they may be located as shown or at different points.

Referring to Figs. 6 to 8, inclusive, the construction of the combustion chamber will be described. This chamber may be a separate structure, or it may form an enlargement in a suitable conduit. I find it more desirable however to make it a separate structure. In the present illustration of my invention it comprises a spherical cast-iron casing 50 which is provided with a detachable cover 51 that is retained in place by bolts or other securing means. To the cover is secured a short normally closed pipe or conduit 52 that is provided with a valve 53. By opening the valve when the pressure is off of the chamber a lighted torch can be inserted from the end for the purpose of starting. When the system is in operation this valve is shut. Mounted on the rear of the casing is a plate 54 to which are connected the fuel-conveying pipe 55 and the compressed air pipe 11. In the plate is a mixing chamber communicating with the interior of the combustion chamber. Located in the compressed air pipe and adjacent to the plate is a butterfly or other throttling valve 57, Fig. 6, for regulating the admission of compressed air from the regenerator to the combustion chamber. Connected to the compressed air pipe between the valve and the chamber is the equalizing pipe 10 which is more fully shown in Fig. 1. Bolted to the combustion chamber is a bracket 58 which supports the mechanism for actuating the throttle valve 57 for the air supply, the controlling valve 59 for the oil supply, and the controlling valve 60 for the water supply. The last-mentioned valve is connected to the interior of the combustion chamber by a pipe 60ª. It is to be noted that this pipe enters the combustion chamber beyond the point where the mixture of fuel and air is formed, and in this way is prevented from interfering with the proper mixing. In order to drain off any liquid which may accumulate in the combustion chamber due to accident or otherwise, a passage is provided on the under side which is closed by a plug 61.

In Fig. 8 the interior of the combustion chamber is shown. The casing is lined with pieces of fire brick 62 to confine the heat and reduce radiation, which are closely fitted one to the other and to the casing. By taking off the cover 51 the interior of the chamber can be exposed or a new lining inserted. In the center of the chamber is a spherical hole or opening 63 in which combustion takes place. Connecting with this enlargement is a passage 64 having a nozzle with an expanding end 65 which imparts velocity to the mixture and prevents back firing. Extending from the central opening toward the turbine is a passage 66 which conveys the products of combustion mixed with steam or other cooling vapor to the nozzles 67. In the present illustration three of these nozzles are shown, but I may employ a greater or less number. These nozzles may be expanding or nonexpanding in character, those shown being of the expanding type, each having a contracting and an expanding portion, the throat for each nozzle being formed between said portions, the nozzle or nozzles discharge the gases under high velocity against the buckets 68 mounted on the wheel of the turbine. The nozzles are mounted on a common support, the interior of said support being provided with a chamber for supplying gases thereto.

By a series of tests I have found that only a small amount of water is required. In the particular arrangement of parts employed, about twice as much water as fuel was introduced. This had the effect of preventing the fire brick lining of the combustion chamber from melting, and the power of the wheel was slightly increased. I do not wish, however, to be understood as limiting myself to using any definite proportion of fuel and water, since the conditions will vary with different installations. My tests up to the present time indicate that the use of too much or too little cooling fluid will cause a falling off in power developed by the turbine. The nozzles may be provided with radiating plates or projections, or they may be cooled by a suitable liquid such as water. When radiating plates are used, it is desirable to leave a small space between the nozzles and the point of entrance into a surrounding wheel casing so as to permit a current of air to pass between the nozzle and the casing, this current of air being induced by the rotation of the wheel and the injector-like action of the gases issuing from the nozzle or nozzles. By test I have found that the air-cooled nozzle above referred to will satisfactorily withstand a combustion chamber temperature which causes the lining of the chamber to melt. When water is employed for cooling purposes, it can be supplied directly from the water tank or from a separate source of supply, as desired. The water or other cooling fluid may be taken from any portion or portions of the cooling system employed to regulate the increase in temperature of the parts. It is important to protect the surfaces of the support as far as possible, owing to the intense heat at this point. In order to do this I have provided a lining of heat-resisting material 69 which should be of sufficient thickness to prevent undue heating of the parts. The nozzles in the present illustration are not provided with heat-resisting linings or coverings, but if desired such linings and coverings may be provided. After the gases pass through the buckets 68 on the turbine wheel, they are collected in the wheel casing and pass through the conduit 23 to the regenerator.

Referring now to the regulating mechanism, Fig. 1, 70 represents a centrifugal governor mounted on the end of the power shaft 4. This is connected to the valve-actuating mechanism by a rod 71. The motion from the governor to the rod is transmitted through a link and bell-crank lever, and the relation of the parts is such that the lower end of the bell-crank lever moves to the right under increase in speed and to the left under decrease in speed.

Referring now to Figs. 8, 9 and 10, the construction of the valve mechanism will be described in detail. 71 represents the rod which is connected at its right-hand end with the centrifugal governor and at the left-hand end with a lever 72 having a slotted end to receive the pin 73 carried by the arm 74. The lever 72 is rigidly attached to a shaft 75 which also forms the spindle of the throttle valve 57, Fig. 6, in the air supply. As the rod 71 moves to and fro the shaft or spindle of the valve is rocked back and forth from its normal position. As the rod moves in the direction of the full-line arrow, it tends to decrease the supply of air by restricting its passage to the combustion chamber; on the other hand, when the rod moves in the direction of the dotted arrow, the reverse action takes place. 76 represents a bracket having a horizontally extending portion at its upper end, through which the spindle 77 extends. The upper end of the spindle receives the arm 74, which is loosely mounted thereon and held in place by the screw 77$^a$. The bracket is provided with a tubular projection 78, upon which are mounted the hub-like portions of the actuators 79 and 80. These actuators are normally held in the position shown in Fig. 10 by extension springs 80$^a$, one spring being provided for each arm. The outer end of each spring is connected to an actuator and the inner end to a fixed abutment 81 that is secured to the tubular projection 78 of the bracket by a set-screw 82. The outer ends of the actuators 79 and 80 are each provided with pawls 83 and 84, which engage with oppositely disposed ratchets 85 and 86. When the arm 87, which is rigidly connected to the arm 74, is moved in the direction of the full-line arrow, it depresses the inner end of the pawl 83, so that it engages with the lower ratchet 85, and in so doing rotates the spindle of the valve 59 in a direction to increase the supply of fuel passing from the pipe 8 to the pipe 55. At the time this action takes place, the actuator 79 remains stationary and in engagement with the abutment 81. As soon as the arm 87 moves back to the central position, as shown in Fig. 10, the spring 80$^a$ moves the actuator 80 back to its normal position, while the valve stem remains stationary. On the other hand, if the arm 87 moves in the direction indicated by the dotted arrow, the pawl 84 will be moved into engagement with the teeth of the upper ratchet 86 and cut down the supply of fuel by rotating the valve stem in the direction shown by the arrow marked "Decrease".

The valve controlling the supply of water to the combustion chamber is provided with a stem 89, the latter being attached to arm 90. On the end of the arm is a pin 91 located in a slot formed in a crank 92, the latter moving in unison with the stem of the fuel valve. As the fuel-controlling valve is moved in one direction or the other from its neutral position, the supply of water to the combustion chamber is correspondingly increased or decreased as the case may be. From the foregoing it will be seen that the movements of the rod 71 control the supply of fuel, air and water to the combustion chamber and that the ratchets and pawls form a lost-motion connection between the load-responsive device and the fuel and water-controlling valves. To state the matter in other words, the air-controlling valve is directly actuated and the fuel and water controlling valves indirectly.

As the supply of air to the combustion chamber is reduced by throttling the speed of the bucket wheel is instantly reduced. Vice versa, as the supply of air increases, the wheel will speed up. Decreasing the supply of air from normal will also throttle the supply of fuel to the combustion chamber. The decrease in the amount of fuel supplied is not noticed immediately, but sooner or later its effect will be noticed and the governor will then return the air-controlling valve to its normal position, the fuel-controlling valve remaining in its throttling position. A further decrease in speed due to lack of energy or an increase in load or both will cause the governing mechanism to open the fuel-controlling valve to a greater extent until the maximum supply is being delivered.

Referring now to Fig. 11: if the turbine is to be governed by throttling the air supply, it is desirable to provide a pressure regulator, as otherwise the compressor would at times pump more air or other gas than is needed. Various other methods of governing the turbine may also require a pressure regulator for the compressor. The regulator is so arranged that when the pressure within the air receiver, combustion chamber or other part, attains the proper value, the regulator will prevent the compressor from acting until the pressure is below the proper value or will decrease the amount of air compressed. By decreasing the amount of work done by the compressor at light loads the efficiency of the system will be improved. 100 is a pipe which connects with the reservoir or any other point on a pipe line from the compressor or on the combustion chamber. Pressure on this pipe is then transmitted to the cylinder space 101 and acts on the piston 102 which moves in the cylinder 103. The upper side of the piston engages the spring 104 which keeps the piston in a position to cover the port 105 so long as the pressure does not exceed the predetermined amount. When the pressure increases the piston compresses the spring so as to uncover the port 105, and air then enters the lower end of the cylinder 106 and forces the piston 107 upward. By means of the rod connected to the piston 107 the lever 108 is moved. This lever is suitably fulcrumed and so arranged that the right-hand end acts on the stem of the valve 109. This valve is the inlet valve of the air compressor designated as 17 in Fig. 1. So long as the lever 108 is maintained in the position shown, it prevents the valve from closing. In other words, the valve will prevent the pressure in the compressor cylinder from rising when the piston starts on the return stroke, thereby preventing the compressor from working. When the pressure in the pipes, receiver, combustion chamber or other part and in the cylinder space 101, falls below the desired amount the piston 102 is forced downward by the spring located above it and closes communication between the cylinder space and the port 105. The air then enters the cylinder 106 at a point above the piston and forces the latter downward, thus moving the right-hand end of the lever 108 out of engagement with the stem of valve 109 and permitting the same to close. In other words, the valve 109 is permitted to seat itself and the compressor then works in the normal manner.

In Fig. 12 is shown a regulator for the air compressor that in many respects is the same as is shown in Fig. 11 but which is so arranged that it is under the control of a speed-responsive device or shaft governor such as 70 in Fig. 1. In this instance the control of the air supply is somewhat more direct than in the previous figure. When this arrangement is employed the pressure regulator may wholly or in large part govern the output of the turbine. As the load decreases the bucket wheel will speed up, and the action of the governor is made to reduce the pressure at which the air compressor is cut out of service or its output decreased. The regulator comprises, in addition to the parts shown in Fig. 11, a lever 110 which is pivoted to the cylinder 103 or other suitable support and is connected by the link 111 with the piston 102. Mounted on the free end of the lever is a weight 112. In order to reduce the friction between the weight and the lever anti-friction rollers, as shown, may be employed. 4 represents the turbine shaft or a shaft moving synchronously therewith. Mounted upon the shaft is a fly-ball governor of suitable construction. I may employ the type illustrated or the one shown in Fig. 1. The governor is provided with a sliding collar which engages one end of the forked lever 114, the other end of the lever also being forked and engaging with the weight 112 for moving it toward and away from the pivot of the lever, a spring 115 being employed to move it toward the outer end of said lever. With this construction the position of the weight will be shifted as the speed of the turbine varies. When the speed increases so that the centrifugal force of the governor balls is greater than the tension of the spring or springs, the collar moves to the left and the weight 112 is moved so as to shorten its lever arm. The pressure regulator piston 102 will then act to stop the compressor at a lower pressure than that at which it previously operated, and thus govern the speed of the turbine indirectly. The lower the pressure of the air supplied, the lower will be the compression in the combustion chamber, the less the impact force of the jet, and the less the driving power supplied to the bucket wheel. Hence the speed of the wheel will tend to return to its normal value. The weights of the shaft governor 70, Fig. 1, may move this weight as well as the valve controlling the supply of fuel, air and water, as previously referred to.

Where the air receiver 19 is used the above described mechanism may prove sluggish. In this case the following governor may be used in conjunction with the one just described, or separately. The apparatus to be described is ordinarily known as a reducing valve, and is arranged to deliver air at a fixed pressure to the combustion chamber regardless of the pressure due to the compressor. The value of the combustion chamber pressure is regulated automatically by the speed of the turbine wheel. When the turbine wheel speeds up owing to a decrease in load, the pressure of the air supply beyond the valve is reduced, from which it follows that the combustion chamber pressure will be decreased. This lessens the impact of the jet and reduces the power supplied to drive the wheel, thus tending to restore the normal speed. Fig. 13 shows a mechanism by which this may be done. 4 represents the shaft of the turbine or a shaft driven thereby, on which is mounted a fly-ball governor 70 of suitable construction. Mounted on the shaft is a sliding collar which is actuated by the governor and which in turn moves the forked lever 114. The outer end of the lever is adapted to move the weight 112 back and forth on the lever 110. The lever is suitably pivoted, as to the cylinder of the regulator, and is connected by a link 111 with the piston 102, as before. The piston is connected by a valve stem with the balanced valve 117. When the piston rises the conduit 116 from the air compressor is cut off from the passage 118 leading to the combustion chamber.

The pressure in the combustion chamber thus acts on the lower side of the piston 102. This serves to balance the weight 112. If the pressure is not sufficient to do this the weight depresses the piston and opens the balanced valve. When this occurs air from the compressor enters from the passage 116 through the valve openings and increases the pressure on the under side of the piston and in the combustion chamber. When the pressure on the under side of the piston exceeds a predetermined amount, the balanced valve 117 closes and further increase in the combustion chamber pressure is prevented. From this it follows that if the weight 112 remains in any given position the pressure in the combustion chamber will be kept at a constant value, regardless of the amount of air being drawn from the combustion chamber or of the pressure of the air compressor. The pressure due to the compressor must however always be greater than the pressure desired in the combustion chamber. The position of the weight 112 determines the exact pressure maintained in the combustion chamber, and the weight itself is controlled by the governor balls. When the speed of the turbine wheel increases the centrifugal force of the balls becomes greater than the force of the springs, and they fly outward thereby moving the weight toward its pivot, decreasing the pressure maintained by the regulator in the combustion chamber. This decreases the impact force of the jet and the driving power applied to the wheel, and thus tends to restore the normal speed. A single set of governor balls and a single lever 114 may be used to operate the weight of a pressure regulator as described in connection with Fig. 12. With this arrangement the method of regulation will be as follows: When the speed increases the pressure in the combustion chamber is automatically reduced and at the same time the maximum air pressure due to the compressor is reduced to about the same value. This is desirable, since it will avoid compressing the air to a higher value than is necessary when the combustion chamber pressure is reduced.

In Fig. 14 is shown a slight modification of the construction shown in Fig. 13, the difference being that the piston 102 and the balanced valve 117 are mounted in separate casings, the latter being provided with conduits 119 and 120.

In some cases it may be desirable to vary the amount of air admitted to the combustion chamber so that the pressure therein will be constant. For instance, if the speed governor should regulate the fuel supply only, the amount of air used would have to be varied if the combustion chamber pressure is to remain constant. This can be done by a reducing valve, as shown in Fig. 13, except that the weight 112 will be fixed in one place and the lever 114, governor balls, etc., will be omitted. The construction shown in Fig. 14 with the above modification could also be used.

It may be desirable to inject some other gas or mixture of gases into the combustion chamber, for example, illuminating gas forced in along with air. These two would burn in the combustion chamber and secure the desired result, of obtaining a product with a large volume; or pure oxygen could be injected into the combustion chamber instead of air, together with some fuel which burns in oxygen. The result would then be similar. A pump for forcing any gas other than air into the combustion chamber could be similar to the air compressors previously described, except that the suction pipe of the compressor would be connected to a gas tank or other source of supply. The compressor can be arranged to pump both air and some other gas or gases at the same time; or the pump can be arranged to pump a mixture of air and any other gas or gases or any other gaseous mixture by having pipes leading from the inlet valves or ports to separate sources of supply. Regulating valves adjusting the size of opening of these pipes can be used to adjust the proportions of the mixture. If gas compressors are employed they should be provided with regulators, as for example, described in connection with previous figures. Where two or more gases are to be employed, a separate valve may be employed for controlling the supply of each kind of gas, and the two or more valves connected to a common stem and actuated by a piston. By properly proportioning the size of the various valves any desired mixture can be obtained.

In Fig. 15 is shown a turbine comprising two movable elements which rotate in opposite directions. With this arrangement the number of rotations per minute of each of the shafts is materially lower than the construction described in Fig. 1. As a further means for reducing the speed of the shafts, the gases act more than once on each element. In other words, the working passage is composed of two or more bucket wheels mounted on one element, and two or more wheels mounted on another element; the two acting to fractionally abstract the energy from the gases. 127 represents the shaft which carries one element and 128 the shaft which carries the other element. The shaft 127 is provided with a pulley 129 for driving a suitable load. The shaft 128 is provided with means, such as gear or pulley 130, for driving the same or a separate load. One revolving element may be connected to the air compressor 17, shown in Fig. 1, and the other element may be connected to a dynamo or other load, as desired. The arrangement shown permits of a number of different combinations, as will readily appear to those skilled in the art. I, therefore, do not wish to limit myself to the specific arrangement described. 131 represents the combustion chamber which is provided with a suitable heat resisting lining and a nozzle 132 that discharges the products of combustion against the buckets of the revolving elements inclosed by the casing 133; the latter being provided with an exhaust conduit 134. Air or gas is supplied to the combustion chamber by the pipe 135, and fuel and a cooling fluid by the pipes 136 and 137. In this connection I may employ the construction shown in Fig. 8 or a different one.

Where stationary or intermediate buckets are employed for reversing the direction of flow of gases from one wheel to the next, I have found that they are liable to be unduly heated, unless special means are employed for cooling them. In order to effectually cool the buckets I provide an arrangement whereby water or other cooling fluid is arranged to circulate around or through the buckets, or both, as desired. 138 represents a support for intermediate buckets which is attached to the casing of the turbine. The support may cover a small or large portion of the circumference of the turbine, depending upon the number of intermediate buckets it carries. In the support are formed one or more chambers 139, which receive a cooling fluid. In the construction illustrated, water enters the chamber 139 from the conduit 140 and passes through a number of small passages 141 in the bucket cover which register with corresponding passages 142 in the center of the buckets. The bucket passages communicate with a common chamber 143 located between the buckets and the wheel shaft. Assuming that the water is delivered to the chamber 139 under pressure, it will pass inward through the passages 141 and 142 into the chamber 143, and thence outward through the passages 142 into the chamber 144; the latter discharging into the conduit 145. Instead of providing each of the buckets with a fluid-carrying passage, some of the buckets may be solid. This will depend largely upon the temperature of the gases passing through the turbine. It is preferable, however, to provide a cooling arrangement for each bucket. Instead of causing the cooling fluid to flow inward into the chamber 143 and then outward, I may so arrange the receiving and discharging conduits 140 and 145 that the cooling water flows in the same direction through all of the passages 141 and 142. The construction of the intermediate can be widely varied without departing from my invention. In the present arrangement chamber 143 is formed by coring out the under side of the bucket-carrying element 146, and securing a plate 147 to its under side. The plate can be made integral with the buckets if desired.

In Fig. 18 is shown in plan view a form of bucket suitable for carrying out the invention. The cross-sectional area and position of the fluid-carrying passage 142 with respect to the buckets is clearly shown. The number of buckets may be increased or decreased to suit the conditions of operation. As a general proposition it may be stated that there will be fewer intermediate buckets at the high pressure end of the turbine than at the low.

In Fig. 19 is shown a bucket cover 148 which contains the fluid-carrying passages 141 that register with or receive water from or discharge it to the bucket passages 142. The buckets may be cast, drop forged, extruded, cut from solid stock, or made detachable, as desired.

I have shown the stationary buckets provided with cooling means while the rotating buckets have not been provided with such means. It is within the scope of my invention, however, to utilize cooling means for the wheel buckets. Where water is employed for cooling the wheel buckets it can enter the wheel through a hollow shaft and be discharged outwardly due to centrifugal force.

In Fig. 20 is shown a gas turbine having a single wheel of the Laval type, although I may use one or more wheels of other constructions. The wheel is inclosed in a suitable casing comprising three principal parts or sections, a lower section 150 that is provided with a foot or other support that rests upon the foundation 151, an upper section 152, and a nozzle cover 153, the latter being bolted or otherwise secured to the upper section 152. The lower section of the wheel casing is provided with a chamber 154, Fig. 23 containing water or other cooling medium. The cooling system for the lower section may be, and preferably is, independent of the cooling system for the upper section or sections of the casing. The inner wall for the lower section is made relatively thin and closely surrounds the buckets so as to reduce the rotation losses and also to abstract the heat therefrom and from the wheel itself. The interior of said lower section is provided with a conduit 155 which extends through the water-containing chamber 154 and communicates with the atmosphere at a point below the foot or support. Water enters the wheel chamber through the conduit 156, Fig. 23, and leaves through a suitable passage, 156ª, Fig. 20. In the foot or support for the lower section is provided one or more openings for permitting the core to be withdrawn after the casting is formed. These openings are closed by plugs 157 as are similar openings in the upper section and cover. The upper surface of the lower section is finished on a plane passing through the axis of the wheel shaft 158, and mounted on top thereof is the upper section 152 of the casing containing a chamber 159. This chamber extends on both sides of the wheel and water or other cooling fluid is admitted thereto by the pipe 160, Fig. 21, and escapes therefrom by the pipe 161, Fig. 24. A nozzle cover 153 is provided having a chamber 162, Fig. 23, to which water or other cooling fluid is admitted by the pipe 163, Fig. 21, the water escaping therefrom by the pipe 164, Figs. 23 and 24. The upper surface of the upper section of the casing is finished, and bolted thereto is the conduit 23 that conveys the waste products of combustion escaping from the bucket wheel to the regenerator. The bucket wheel of the turbine and the nozzle are so situated that the gases exhausting therefrom enter the chamber 165 and pass directly to the regenerator. The conduit 23 is surrounded by a chamber 166, Fig. 23 or 44, Fig. 3, through which the air from the compressor preferably passes prior to entering the combustion chamber.

One or more nozzles for directing the products of combustion against the wheels are indicated at 67, Figs. 1, 2, 7, 8 and 20. The nozzles are so constructed that they extend through the opening 168, Figs. 23 and 24, between the upper half of the casing and the nozzle cover 153. I have found it desirable to leave a space between the nozzles and the walls of the casing through which a certain amount of air is indrawn after the fashion of an injector when the turbine is in operation. The air in passing over the surface of the nozzles tends to prevent the temperature from increasing above a certain predetermined degree. In some instances, where the temperature of the exhaust gases is lower I may so arrange the nozzle and parts of the wheel casing that no space is provided for admitting air. Instead of depending upon the air alone to keep the temperature of the nozzle or nozzles down I may use a water-cooling jacket such as is above described in connection with the wheel casing, or I may depend upon the air as well as the water circulation for this purpose.

Referring to Figs. 21 and 22, a clamp 169 is provided which has a screw-threaded projection on one end entering a screw-threaded hole in the nozzle cover or casing. The lower portion of the clamp is bolted to the lower half of the wheel casing and in this manner serves as an additional means for securing the parts of the casing together and resisting internal strains due to any cause. In the present instance the screw-threaded projection also conveys a cooling fluid to the chamber 162 in the nozzle cover or casing 153.

I do not claim herein the specific construction of the regenerator, since it forms the subject-matter of a divisional application S. N. 309,836, filed April 4, 1906, which division was made at the requirement of the Patent Office. This application has resulted in Patent 1,000,969 of August 15, 1911. I do not claim the specific construction of the combustion chamber herein, since it forms the subject-matter of my divisional application S. N. 309,742, filed April 4, 1906, which division was made at the requirement of the Patent Office. This application has resulted in Patent 891,715 of June 23, 1908. I do not claim the specific construction of the governing mechanism herein, since this forms the subject-matter of my divisional application S. N. 309,743, filed April 4, 1906, which division was made at the requirement of the Patent Office. This application has resulted in Patent 1,000,968, of August 15, 1911. I do not claim the specific construction of the turbine herein, since this forms the subject-matter of my divisional application S. N. 309,744, filed April 4, 1906, which division was made at the requirement of the Patent Office. This application has resulted in Patent 969,760 of September 6, 1910.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is.

1. In combination, a turbine, a combustion chamber for supplying the turbine with vapor energy, means for discharging fuel and a cooling agent into the combustion chamber, a governor responsive to the load on the turbine for controlling said means, a compressor for discharging air into the combustion chamber against the pressure therein, a regulator for the compressor that is responsive to pressure variations, a conduit leading from the combustion chamber through which the resultant products of the action of the fuel, air and cooling agent therein pass to the turbine, and a regenerator heated by the gases exhausting from the turbine which increases the temperature of the air as it passes from the compressor to the combustion chamber.

2. In combination, a turbine having a wheel or rotor, a combustion chamber, means feeding fuel, air and water to the combustion chamber, valve means for varying the supplies of fuel, air and water to the chamber, a governor responsive to the speed of the turbine for controlling said valve means, a nozzle that receives the products of combustion from the chamber and discharges them against the wheel, and a regenerator that utilizes the turbine exhaust to heat the air on its way to the combustion chamber.

3. In combination, a gas turbine, a combustion chamber for supplying the turbine with motive fluid, a tank under pressure for directly supplying fuel to the combustion chamber against its internal pressure, a source of air supply under pressure discharging into the chamber, a tank for supplying water to the fuel and air after they are mixed and previous to combustion, means for raising the temperature of the air prior to delivery to the combustion chamber, and an equalizing connection between the tanks and said source of air supply.

4. In combination, a gas turbine, a combustion chamber arranged to supply products of combustion to the turbine for producing rotation, means for supplying combustible materials to the chamber, a regenerator through which at least one of said materials passes on its way to the chamber, a conduit for conveying exhaust gases from the turbine to the regenerator, and a governing device responsive to load changes on the turbine for regulating the quantity of combustible material admitted to the chamber.

5. In combination, a turbine, a combustion chamber, means feeding fuel and air to the combustion chamber, valve means for regulating the supply of fuel and air to the chamber, a governor responsive to the speed of the turbine for controlling said valve means, and means for conveying the products of combustion from the chamber to the turbine.

6. In combination, a turbine having a wheel or rotor, a combustion chamber, means for feeding fuel, air and water to the combustion chamber, a governor responsive to the speed of the turbine for varying the supplies of fuel, air and water to said chamber, and a nozzle that receives the products of combustion from the chamber and discharges them against the wheel.

7. In combination, a turbine, a chamber supplying products of combustion to the turbine, a mixing chamber anterior to the combustion chamber, means for supplying fuel and gas to the mixing chamber against the pressure therein, valves controlling the admission of the fuel and gas to the mixing chamber and before combustion takes place, and a governor responsive to load changes on the turbine for controlling the valves, to control the supplies of fuel and gas.

8. In combination, a turbine, a means directing the motive fluid against the rotor of the turbine, a chamber continuously supplying products of combustion to said means, a mixing chamber, sources of supply which feed fuel and gas to the mixing chamber against the pressure therein, a nozzle located between the mixing and combustion chambers for preventing back firing, means controlling the admission of the combustion elements to the mixing chamber, and a governor responsive to load changes on the turbine which controls the admission of one of said elements to the mixing chamber.

9. In combination, a turbine, a chamber in which combustion continuously takes place, means for feeding fuel, gas, and a cooling liquid to the combustion chamber in definite amounts, a governor responsive to load changes on the turbine for simultaneously varying the supplies of fuel, gas and cooling liquid to the combustion chamber, and an expanding nozzle receiving the products of combustion from the chamber and discharging them against the turbine wheel.

10. In a governing mechanism for gas turbines, the combination of a bucket wheel, a chamber wherein combustion continuously takes place, an expanding nozzle which continuously supplies the products of combustion to the wheel, a fuel-controlling valve, an air-controlling valve, a lever for actuating the valves, a speed-responsive device, and a connecting rod between the lever and said speed-responsive device.

11. In a governing mechanism for gas turbines, the combination of a bucket wheel, a combustion chamber arranged to supply vapor energy to the wheel, a mixing chamber anterior to the combustion chamber, sources of fuel, air and water discharging into the mixing chamber, a speed-responsive device, individual valves governing the supplies of fuel, air and water to the mixing chamber, and a means operated by the speed-responsive device for actuating the valves to increase or decrease the amount of fuel, air and water supplied as the load changes.

12. In combination, a gas turbine, a combustion chamber continuously discharging the products of combustion against the turbine buckets to produce rotation, a source of fuel arranged to continuously discharge into the combustion chamber, a compressor arranged to continuously supply a gas to the chamber to support combustion, a regulator for the compressor which is responsive to pressure variations, a speed responsive device driven by the turbine, and a valve actuated by the device which is located intermediate the compressor and the combustion chamber and throttles the admission of gas to the combustion chamber.

13. A gas turbine, a combustion chamber, means for continuously supplying fuel to the chamber, and means for continuously supplying gas to the chamber, in combination with a regulator for the gas supply, a means sensitive to pressure variations for controlling the action of the regulator, and a load-responsive device modifying the action of the means responding to pressure variations.

In witness whereof I have hereunto set my hand this 29 day of December, 1904.

SANFORD A. MOSS.

Witnesses:
 JOHN A. MCMANUS, Jr.,
 DUGALD McK. MCKILLOP.